US007145434B2

(12) United States Patent
Mlynarczyk et al.

(10) Patent No.: US 7,145,434 B2
(45) Date of Patent: Dec. 5, 2006

(54) SYSTEM AND METHOD FOR KEY CONTROL IN AN ELECTRONIC LOCKING SYSTEM

(75) Inventors: Mitchell S. Mlynarczyk, Hoffman Estates, IL (US); John B. Payson, Naperville, IL (US); Aron J. Hoekstra, Lansing, IL (US); Brock E. Robinson, Crest Hill, IL (US); Kenneth A. Kaczmarz, LaGrange Park, IL (US); Michael J. Koch, Roselle, IL (US)

(73) Assignee: Compx International Inc., Mauldin, SC (US)

( * ) Notice: Subject to any disclaimer, the term of this patent is extended or adjusted under 35 U.S.C. 154(b) by 525 days.

(21) Appl. No.: 10/419,718

(22) Filed: Apr. 21, 2003

(65) Prior Publication Data

US 2004/0207509 A1 Oct. 21, 2004

(51) Int. Cl.
*G05B 19/00* (2006.01)

(52) U.S. Cl. ..................... 340/5.23; 340/5.5; 340/5.65; 235/382.5

(58) Field of Classification Search ............... 340/5.25, 340/5.5, 5.24, 5.31, 5.72, 5.23, 5.22, 5.65; 235/382.5; 361/172; 70/277, 278.2, 278.3
See application file for complete search history.

(56) References Cited

U.S. PATENT DOCUMENTS

| | | | | | |
|---|---|---|---|---|---|
| 4,646,080 | A | * | 2/1987 | Genest et al. | 340/5.24 |
| 4,766,746 | A | | 8/1988 | Henderson et al. | |
| 4,811,012 | A | * | 3/1989 | Rollins | 340/5.25 |
| 4,845,490 | A | * | 7/1989 | Ward et al. | 340/5.27 |
| 4,887,292 | A | | 12/1989 | Barrett et al. | |
| 4,916,443 | A | | 4/1990 | Barrett et al. | |
| 4,947,163 | A | | 8/1990 | Henderson et al. | |
| 4,988,987 | A | | 1/1991 | Barrett et al. | |
| 5,014,049 | A | * | 5/1991 | Bosley | 340/5.31 |
| 5,204,663 | A | * | 4/1993 | Lee | 340/5.28 |
| 5,475,375 | A | | 12/1995 | Barrett et al. | |
| 5,477,041 | A | * | 12/1995 | Miron et al. | 340/5.28 |
| 5,745,044 | A | * | 4/1998 | Hyatt et al. | 340/5.23 |

OTHER PUBLICATIONS

U.S. Appl. No. 10/318,328, filed Dec. 12, 2002 (CXP-2).

* cited by examiner

*Primary Examiner*—Edwin C. Holloway, III
(74) *Attorney, Agent, or Firm*—Dority & Manning, P.A.

(57) ABSTRACT

An apparatus and a method for use with an electronic locking system is provided. At least one key is selected in order to have access to at least one lock. This key to lock relationship is transferred to a memory of the key. The key is presented to the lock and at least a portion of the key to lock relationship from the key is transferred to a memory of the lock. This transfer updates the memory of the key to lock relationships in the lock. The update of the memory in the lock is noted in the memory of the key. The key may then be placed in communication with a computer so that at least a portion of the memory of the key is transferred to a database in the computer. This transfer updates the database in order to reflect the fact that the memory of the lock has been updated and completed.

26 Claims, 14 Drawing Sheets

SYSTEM AND METHOD FOR KEY CONTROL IN AN ELECTRONIC LOCKING SYSTEM

BACKGROUND

The present invention is intended as an improvement to key control systems in electronic locks. Currently, the process of adding and deleting valid keys in an electronic lock system requires a supervisor, serviceman, or someone of higher position than a "normal" user to go to the lock to perform the manipulation. Once this person is at the lock they can either (1) show a "supervisor" key which will allow other keys to be added or deleted, (2) show a "programming" key which will allow other keys to be added or deleted, or (3) connect to the lock through a computer which will update the lock's memory. As previously stated, each of these methods requires someone in a management position to visit each lock that needs to be updated. If, as in the vending machine industry, there are hundreds of machines (locks) that need to be maintained, this process can be quite expensive and time consuming.

Further, in currently available electronic lock systems, each lock keeps track of the keys that were presented to it, valid and invalid. A manager may then go to the lock and upload (into a computer) the keys that were presented to the lock. This is commonly called an "audit trail". If a supervisor needed to know which locks a key has been taken to, the supervisor would need to visit each lock that the key could be taken to, and upload each machine's audit trail. As noted above, the cost associated with a manager visiting each machine is quite high.

There are other currently available systems that will allow remote database manipulation and audit trail gathering. These systems require either expensive integral call phone technology, or an expensive hard wired network system.

A need for a system exists that will allow user database manipulation and audit trail gathering automatically, cost effectively, and without requiring managers to visit locks periodically.

Some examples of current electronic lock systems include U.S. Pat. Nos.: 4,916,443; 5,475,375; 4,988,987; 4,947,163; 4,887,292; and 4,766,746. The entire disclosure of these six United States patents are incorporated by reference herein in their entirety for all purposes.

SUMMARY

Various features and advantages of the invention will be set forth in part in the following description, or may be understood from the description, or may be learned from practice of the invention. The present invention includes a key control and audit trail system that uses standard "user" keys as a method of maintaining lock databases and gathering audit trails. The process is completely invisible to the standard user may and take place during normal, standard user, key use. A method is provided to simply and conveniently perform and track these operations.

The present invention includes preparing a dataset of key to lock relationships that designate which keys are accessible to which locks. In one exemplary embodiment of the present invention the accessibility of the keys to the locks allows for the locks to be opened by an appropriate key. This dataset of key to lock relationships is transferred to a memory of one of the keys, and the key is presented to one of the locks. At least a portion of the dataset is transferred from the key to a memory of the lock. Consequently, the memory of the lock is updated according to any changes that may be present in the dataset. The memory of the key is also updated in order to reflect any updated change to the lock.

In an alternative exemplary embodiment, the key may then be placed in communication with a computer and at least a portion of the memory of the key may be transferred to a database in the computer. This transfer updates the database and allows for an indication of the completion of the update to the memory of the lock. Therefore, the administrator of the system is informed that the change in the key to lock relationships has been effectively communicated to that particular lock.

The dataset of key to lock relationships and the changes made thereto may be done on the same computer as the database, or may be conducted on a separate computer or other device.

The lock may be an electronic lock that has a serial number. The dataset may assign a unique alphanumeric lock name to the serial number of the lock. Additionally, the key may be an electronic key that has a serial number with a unique alphanumeric user name assigned to the serial number in the dataset of key to lock relationships.

In one exemplary embodiment of the present invention a modification log may be created when the administrator desires a change to be made to the dataset of key to lock relationship. This modification log can be transferred to the lock memory through the key memory and eventually back to the computer. During transfer, the lock memory may update the modification log with the date and time of completion of the update to the memory of the lock. Once transferred to the computer, the database may be updated with the locks that have been modified along with the date and time of modification. Encryption and other forms of protection may be incorporated in order to ensure the integrity of the system. For instance, the key may have an encrypted key ID, and the lock may have a list of valid key IDs in the memory of the lock. Upon presenting the key to the lock, the lock will decrypt the key ID, and then compare the key ID to the list of valid key IDs of the memory of the lock. If the IDs do not match, the key will not have access to the lock and the lock remains closed. If the IDs do match, a second layer of protection will be used in order to ensure that the key being presented is valid.

Here, a key is provided with an encrypted key password in the memory of the key, and the lock is provided with a lock password that corresponds to the key in the memory of the lock. The lock will search the key memory for the encrypted key password that corresponds to the particular lock into which the key is presented. The lock will decrypt the key password and compare the key password to the lock password corresponding to that particular key. A new lock password is selected by the lock, encrypted, and stored in the memory of the key. If the passwords match, the lock will open and allow access to the user. If the passwords do not match, the key is not deemed to be valid and the lock will remain closed.

DETAILED DESCRIPTION

Figure 1:
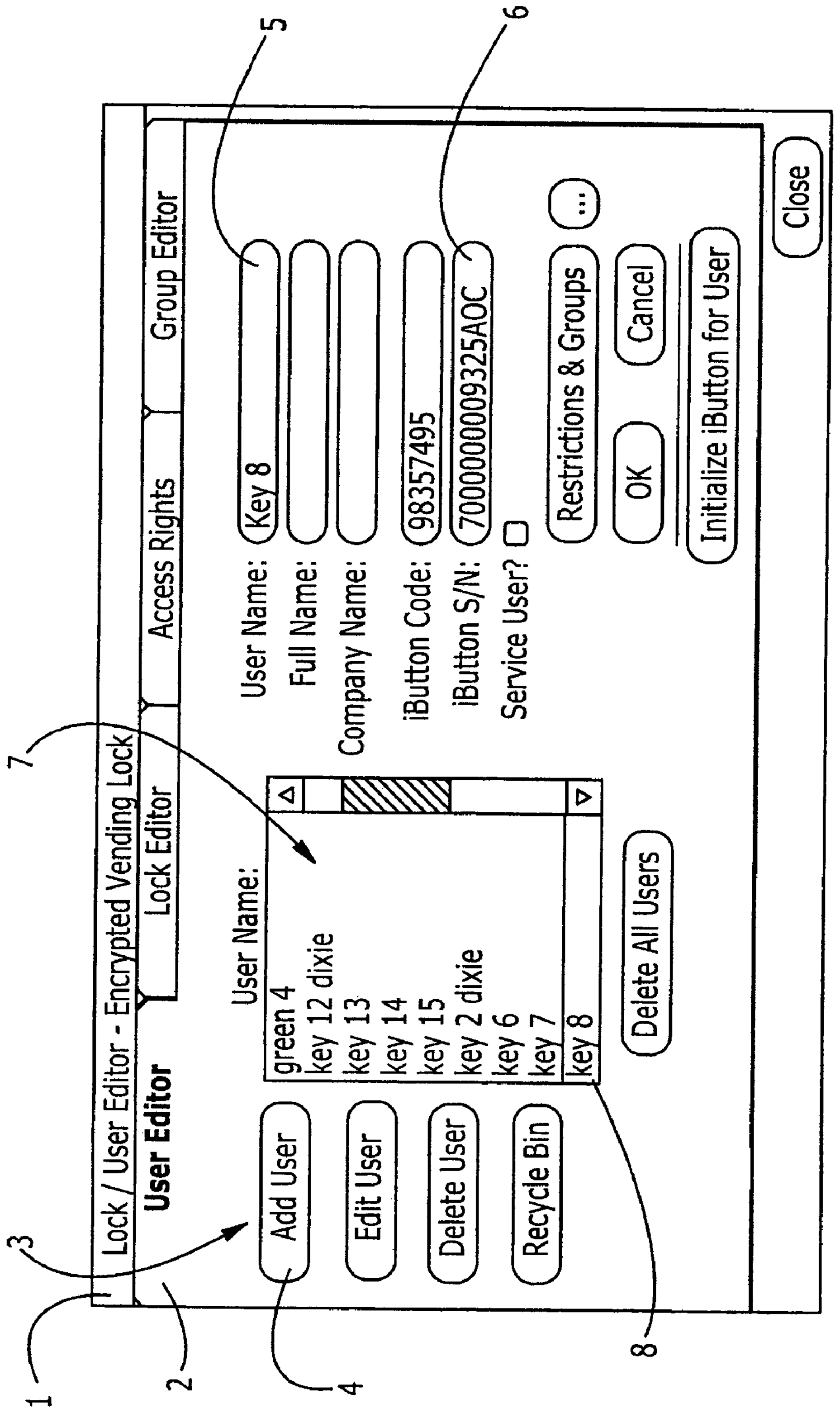
FIG. 1 is a screen showing the creation of a new user.

Reference will now be made in detail to embodiments of the invention, one or more examples of which are illustrated in the drawings. Each example is provided by way of explanation of the invention, and not meant as a limitation of the invention. For example, features illustrated or described as part of one embodiment can be used with another embodiment to yield still a third embodiment. It is intended that the present invention include these and other modifications and variations.

Computer hardware and software may be employed in order to provide a method of maintaining lock databases and gathering audit trails through the use of standard "user" keys. Referring to FIG. 1, reference numeral 1 designates the lock/user editor in a software package. This menu is used by the administrator or supervisor to create and maintain users, locks, and access rights in the system. The first tab, the user editor 2, is used to create and maintain users. Maintaining users can be one of four options in the options area 3. To create a user, the administrator presses the Add User button 4. This allows the new user's name to be entered into the User Name field 5 and the user's key (iButton ®) serial number into the iButton® Serial Number field 6. The trademark iButton® is a federally registered trademark owned by Dallas Semiconductor Corporation, and used for the sale of goods and services including metal containers for enclosing semiconductor and integrated circuit devices, microprocessors and/or microcomputers, in addition to the sale of goods and services including semiconductor and integrated circuit units. The trademark iButton's ® is covered under registration numbers: U.S. Pat. Nos. 2,478,289; 2,482,685; 2,388,024; and 2,388,023.

The Add User step creates a one-to-one relationship between the iButton's ® serial number and the user name. Each time the software uses the user's name it actually is referring to the iButton's ® serial number. Once the user's information is entered into the system their name will be displayed in the user name list box 7. In this exemplary embodiment, "key 8" has been entered and is displayed by reference numeral 8. In theory, the administrator would repeat this process until every user that will have access to any of the locks is entered into the system. The maximum number of users is limited only by the memory size in the administrator's computer.

Figure 2:
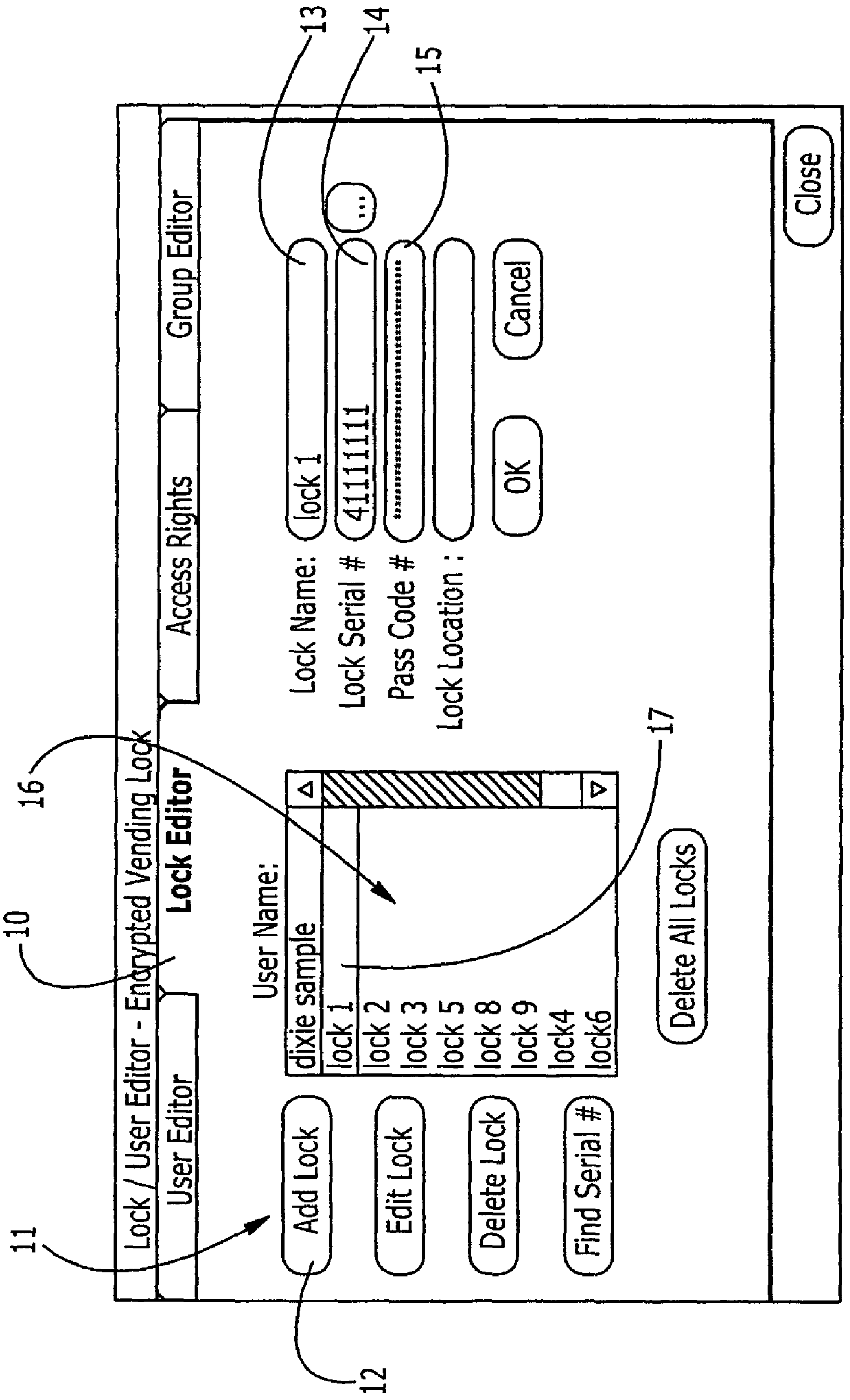
FIG. 2 is a screen showing the creation of a new lock.

Turning now to FIG. 2, reference numeral 10 designates the lock editor tab. This tab is used to create and maintain locks. Maintaining locks can be one of four options in an options area 11. To create a lock, the administrator presses the Add Lock button 12. This allows the new lock's name to be entered into the Lock Name field 13, the lock's serial number into the Lock Serial# field 14, and the lock's pass code into the Pass Code# field 15. The lock's pass code is a number that the software uses in order to communicate with the lock. This is an additional level of security that prevents unauthorized software use. This step creates a one-to-one relationship between the lock's serial number and the lock name. Each time the software uses the lock's name it actually is referring to the lock's serial number. Once the lock's information is entered into the system it's name will be displayed in the lock name list box 16. In this exemplary embodiment, "lock 1" has been entered and is displayed by reference numeral 17. In theory, the administrator would repeat this process until every lock that will be accessed by the users is entered into the system. The maximum number of locks is limited only by the memory size in the administrator's computer.

Figure 3:
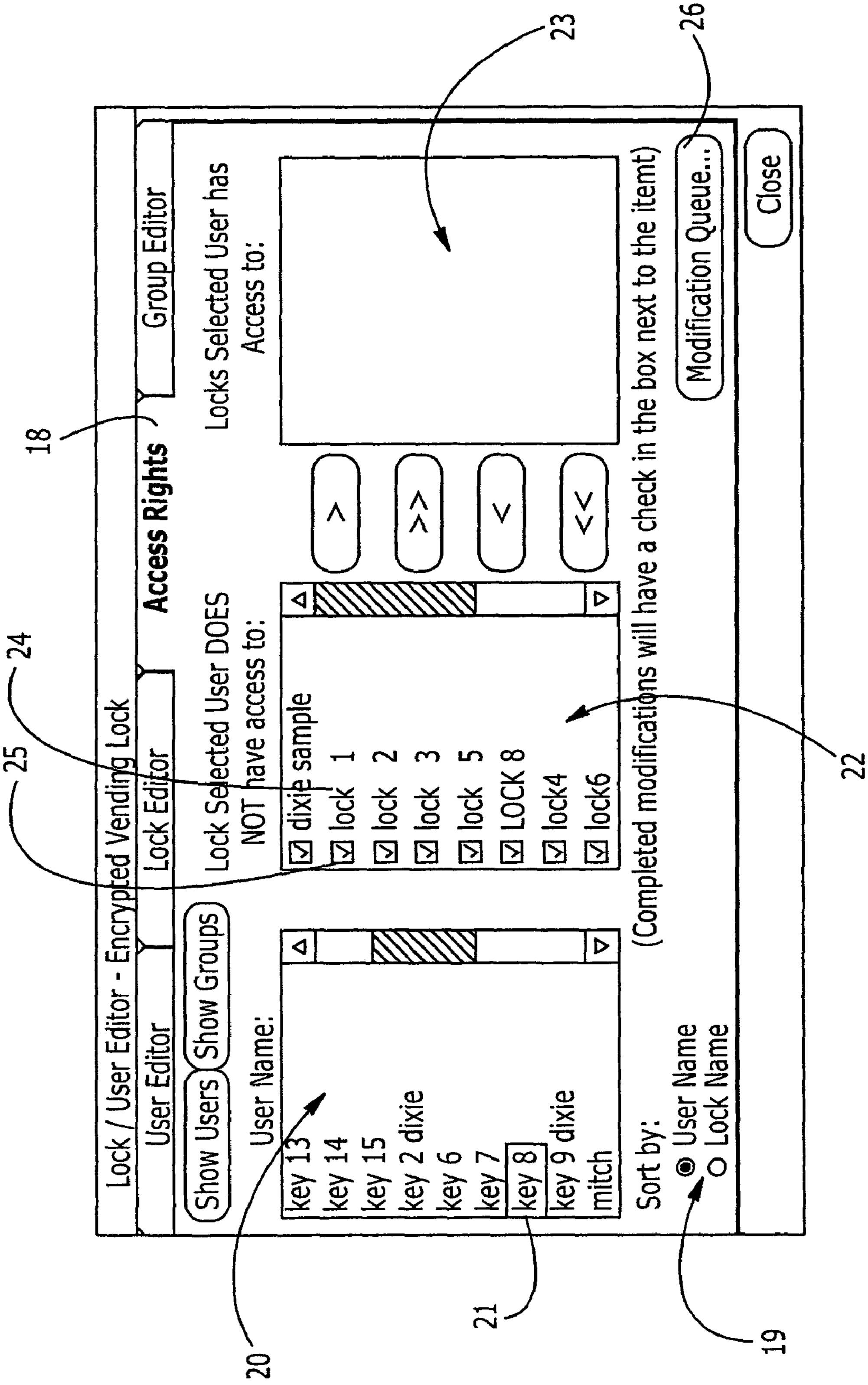
FIG. 3 is a screen showing the access rights screen with the user not having access.

FIG. 3 illustrates the access rights screen. Using this screen the operator chooses which users can use (open) which locks. The access rights tab 18 is the third tab available on the lock user editor menu 1. It is a three section window that shows which users have or do not have access to certain locks. Alternatively, the access right tab may display which locks can or cannot be accessed by certain users. There is a selection button 19 that allows the operator to choose which listing, whether by users or locks, will be displayed. In this exemplary embodiment, the screen is shown to display which locks can or cannot be accessed by certain users. The far left area is the user name list box 20. This box will show all users that have been entered into the system, using the method illustrated in FIG. 1. "Key 8" which is shown by reference numeral 21 is selected. The second and third areas illustrate which locks the selected user has access to 23 and which locks the user does not have access to 22. All of the locks, created by the method illustrated in FIG. 2, will appear in one of the two areas shown by reference numerals 22 and 23.

"Key 8", reference number 21, does not have access to "lock 1" at reference numeral 24. Each of these entries, in the two areas 22 and 23 are accompanied by a checked or unchecked box. A checked box denotes that this user-lock relationship is complete, signifying that the relationship is true in the lock's memory. An unchecked box denotes that this user-lock relationship is incomplete, signifying that it is true in the administrator's computer only, not the lock. The checked box at reference numeral 25, denotes that "lock 1", reference numeral 24, has a completed user lock relationship stored in the memory of "lock 1", reference numeral 24.

Figure 4:
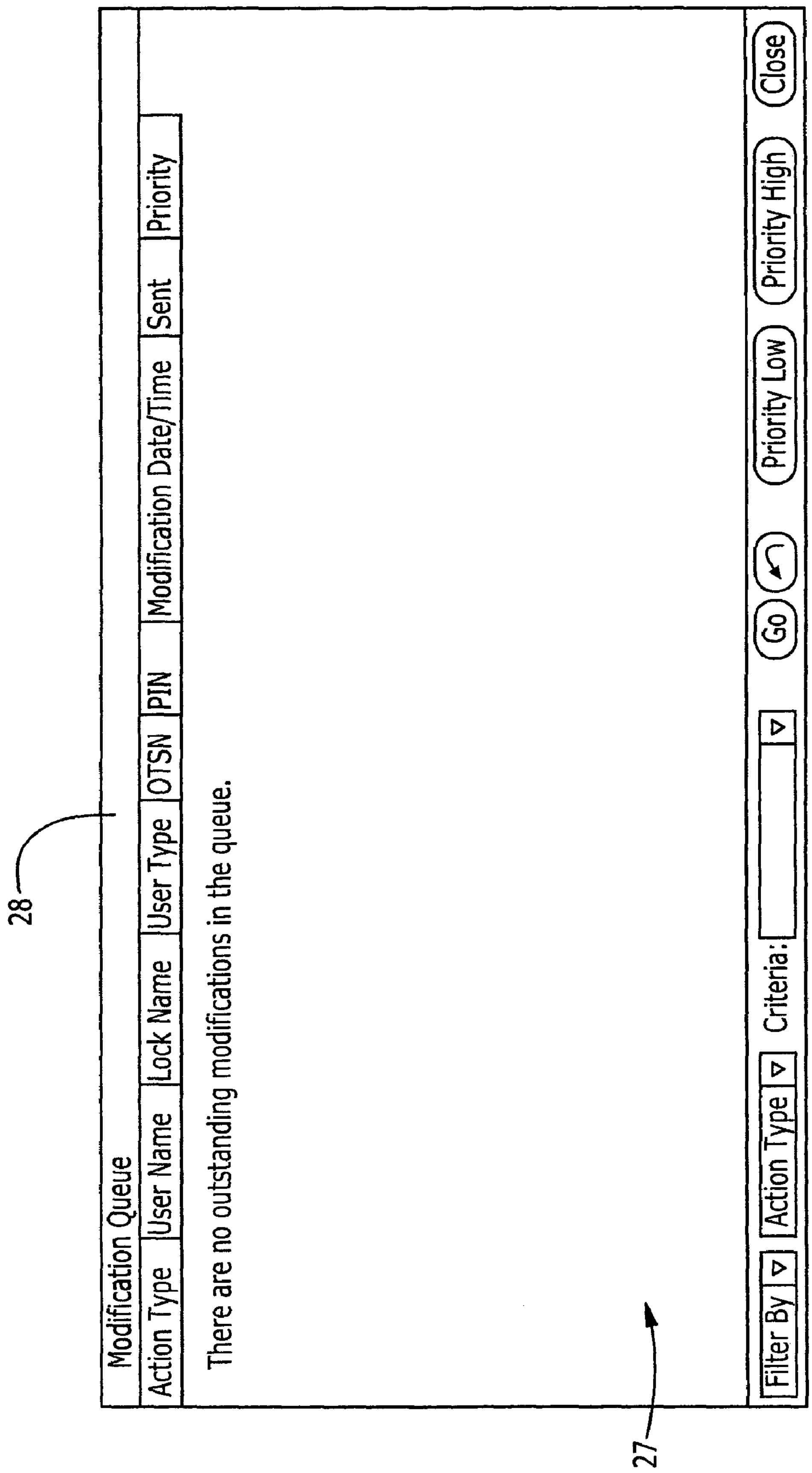
FIG. 4 is a screen showing the empty modification queue.

Every time that a user-lock relationship is modified by the administrator, a record of the incomplete modifications is kept. This record is called the modification queue. It is accessed by the modification queue button 26 as shown in FIG. 4. The modification queue 28 in this exemplary embodiment is empty. All entries in the queue are stored in the modification queue list 27.

Figure 5:
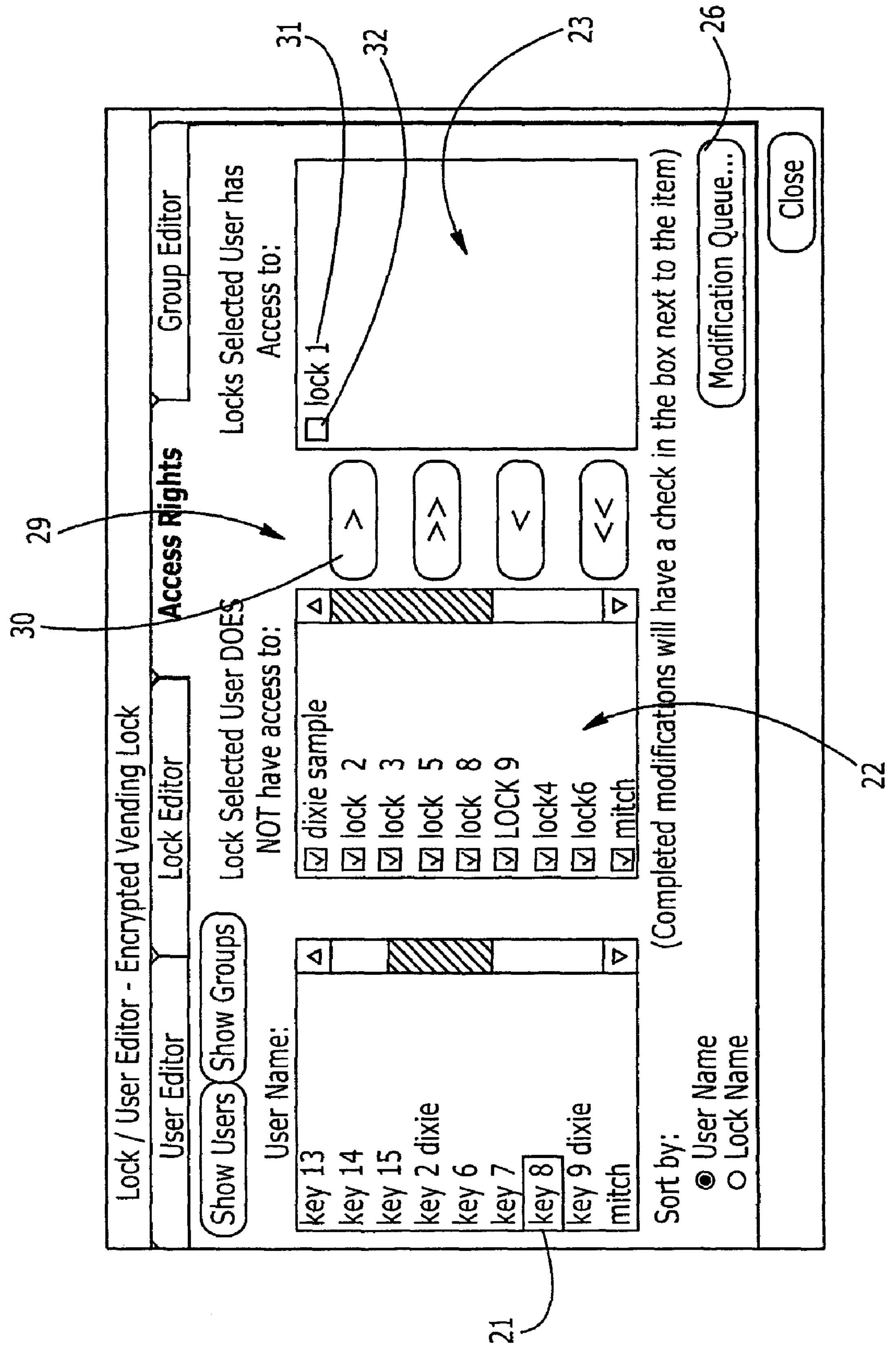
FIG. 5 is a screen that shows the user having access and the modification in an incomplete state.

Turning to FIG. 5, "key 8" 21 has been given access to "lock 1" 31. The administrator selected "key 8" 21 and "lock 1" 31, then used one of the access modification buttons 29 to give "key 8" 21 access to "lock 1" 31. The button illustrated by reference numeral 30 moves one entry from the "does not have access" section 22 to the "does have access" section 23. Other access modification buttons 29 exist to do the opposite modification and to perform multiple modifications in both directions. In this exemplary embodiment "lock 1" 31 is shown in the "locks selected user has access to" area 23 and is shown with an unchecked box 32.

Figure 6:
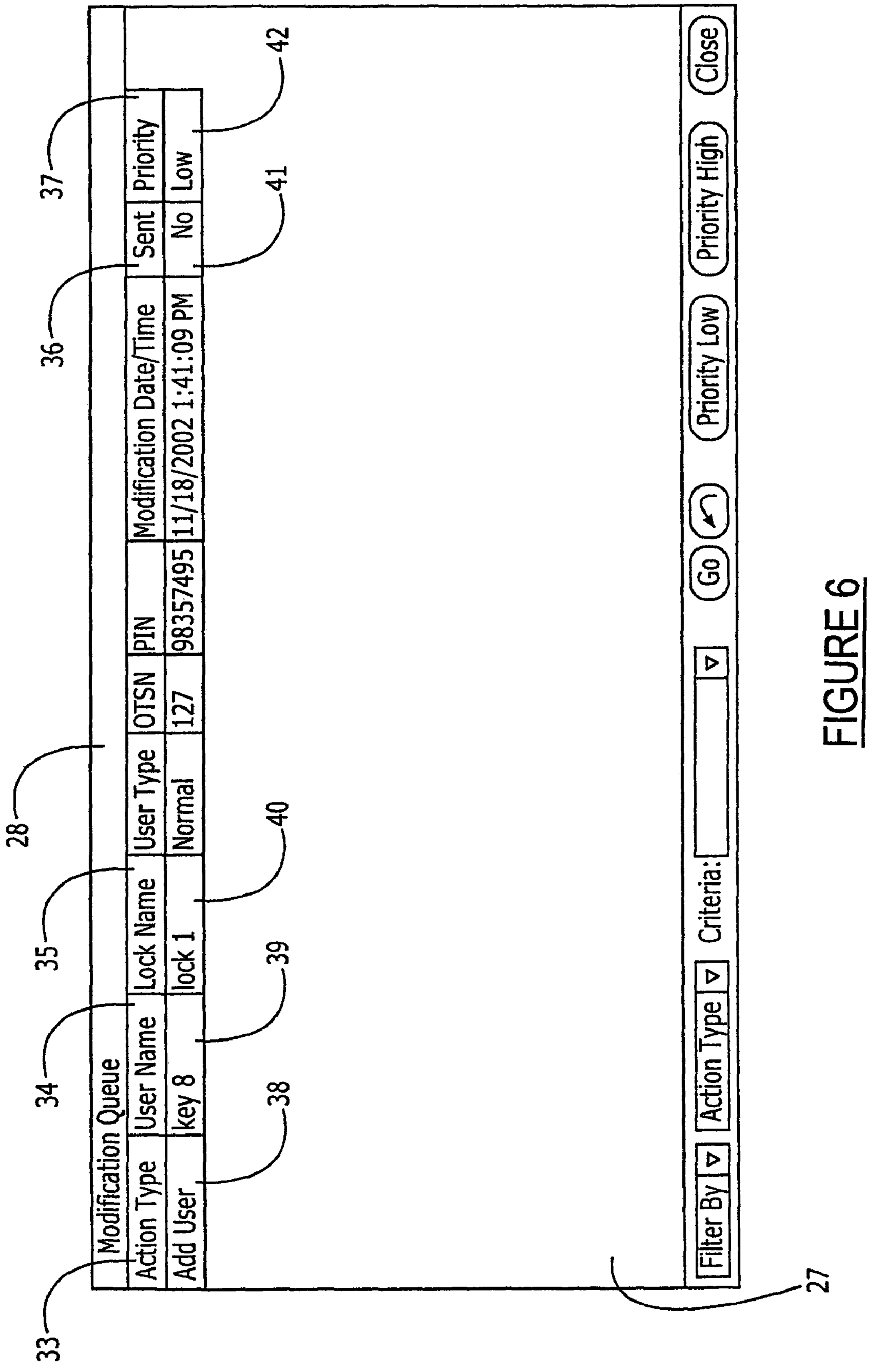
FIG. 6 is a screen that shows the modification queue with one modification that has not been sent.

Pressing the modification queue button 26 will again bring up the modification queue, now illustrated in FIG. 6.

The modification queue is a multi column report that includes: an action type 33, a user name 34, a lock name 35, a "sent" status 36, and a priority level 37. The action type 33 typically shows whether the user is being added or deleted. Here, the action type 33 is "add user" 38. The user name 34 shows to which user name the action type 33 is being performed, in this case, "key 8" 39. The lock name 35 shows to which lock name the action type 33 is being performed, in this case "lock 1" 40. The "sent" status 36 shows whether or not the modification has been sent, on a user key to the lock. In this case the "sent status" is "No" 41. Since each key may be limited to two hundred lock-key manipulations in certain exemplary embodiments, and there may be more than two hundred modifications in the queue, there is a system to raise the priority of select manipulations. This status is shown in the priority column 37 and in this case is "low" 42.

Figure 7:
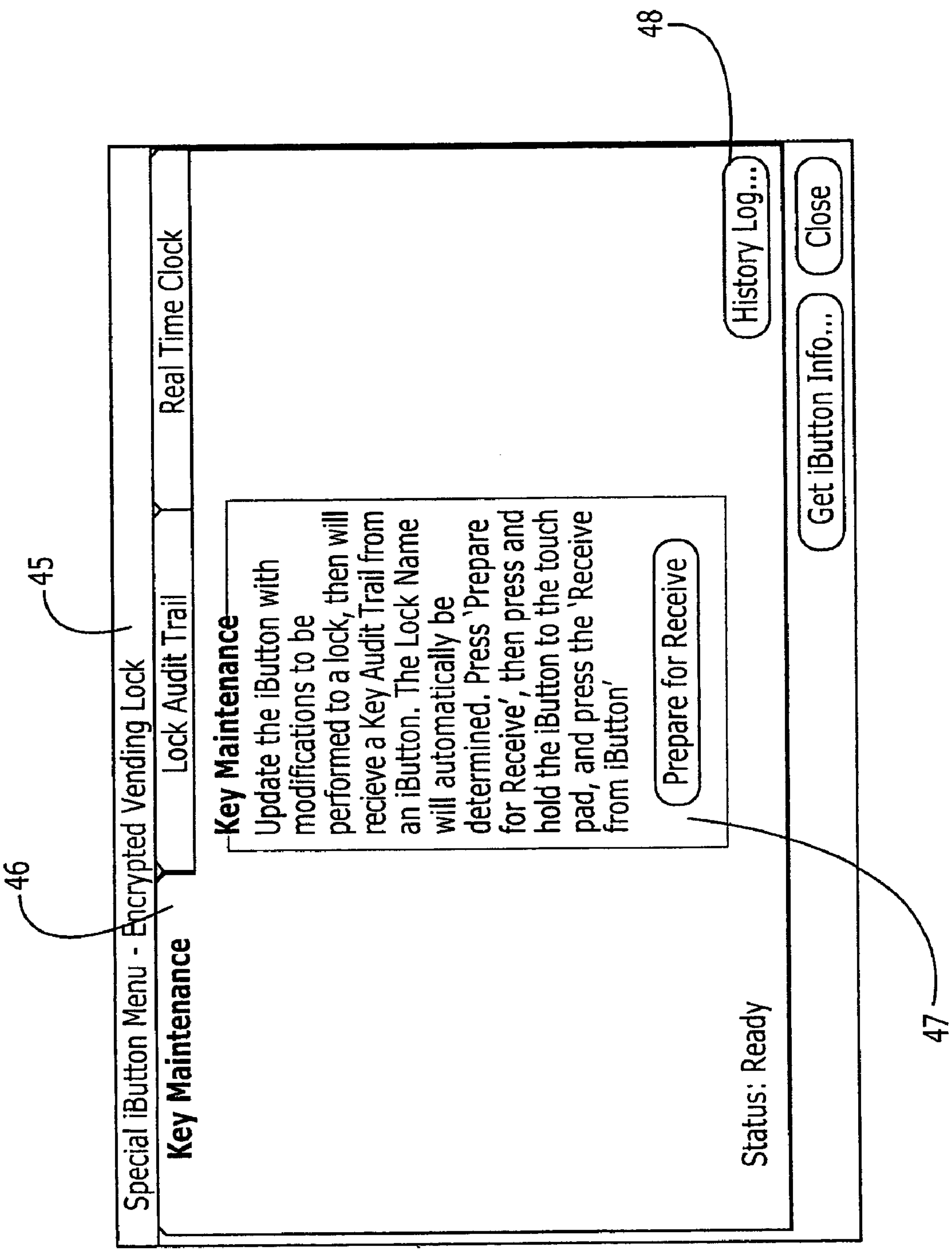
FIG. 7 is a screen showing the key maintenance operation.

Turning now to FIG. 7, a special iButton® menu 45 is shown. The first tab is the key maintenance tab 46. This tab 46 has a key maintenance "prepare for receive" button 47 which is used to begin the key maintenance process. This process (1) removes key audit trails from the key, (2) removes processed lock-key manipulations from the key, and (3) adds any new lock-key manipulations to the key. Using this process, incomplete modifications such as the one shown in FIG. 6 are transferred to locks and information is brought back to the software. Information input to the software informs the software that the modification is complete so that this modification may be removed from the modification queue and can be recorded as complete.

The administrator presses the "prepare for receive" button 47 and places the user key in a base station attached to the computer. This will begin the maintenance process noted above. In one exemplary embodiment as discussed above the manipulation of adding "key 8" to "lock 1" will be placed on the key. A record of all key maintenances performed is kept and can be viewed by pressing the history log button 48.

Figure 8:
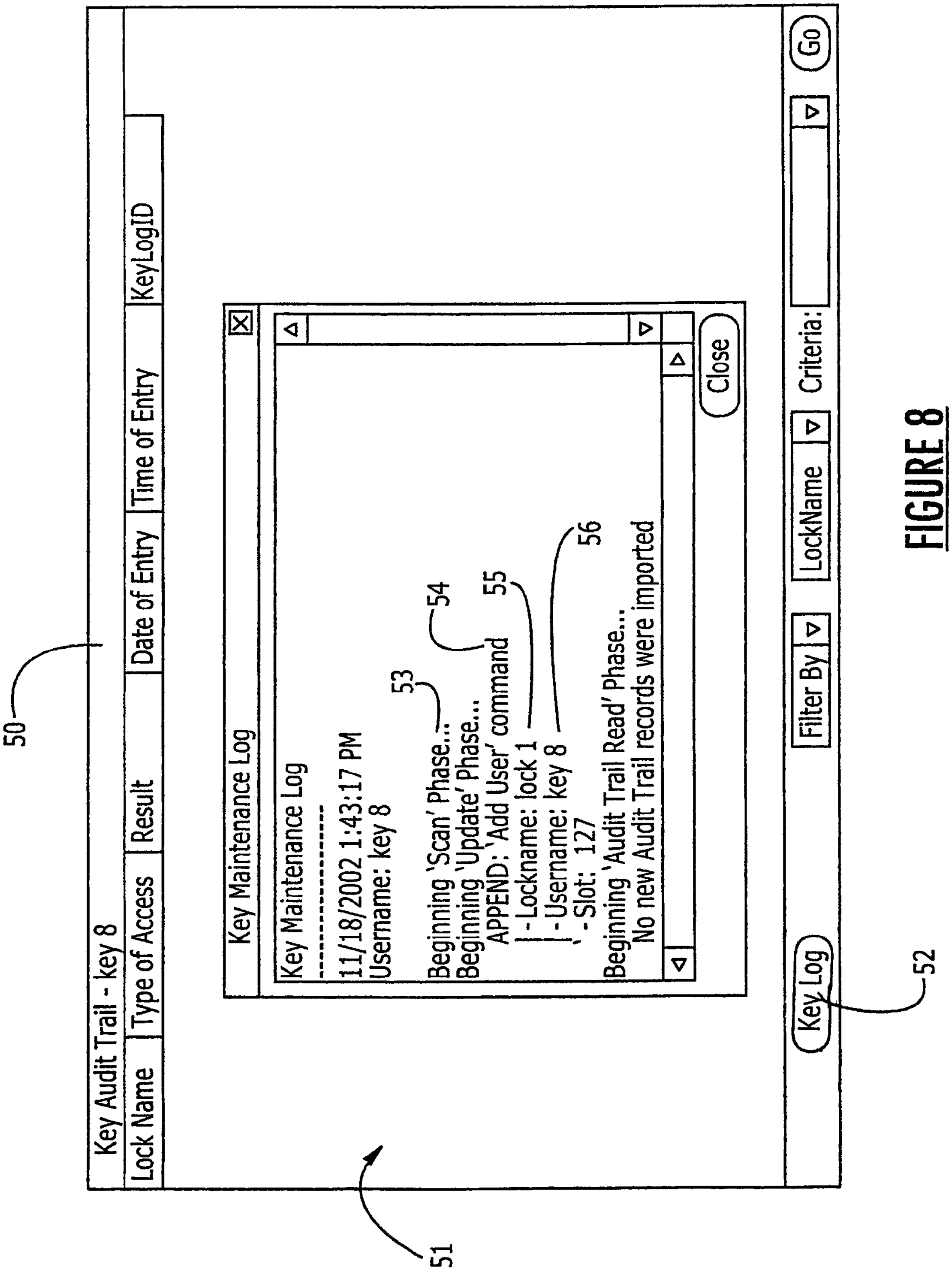
FIG. 8 is a screen showing the key maintenance log for an outgoing modification.

After the maintenance is performed, the key audit trail window 50 is shown. This is illustrated in FIG. 8. Any audit trails present on the key would be displayed in the audit trail display area 51. To see details of the key maintenance, the key log button 52 is pressed. This will cause the key maintenance log to be displayed. Here, it can be seen that the key was scanned 53, there was an "add user" command placed on the key 54, which added add "key 8" 56 to "lock 1" 55. Additionally, any other modifications to the key would likewise be displayed.

Figure 9:
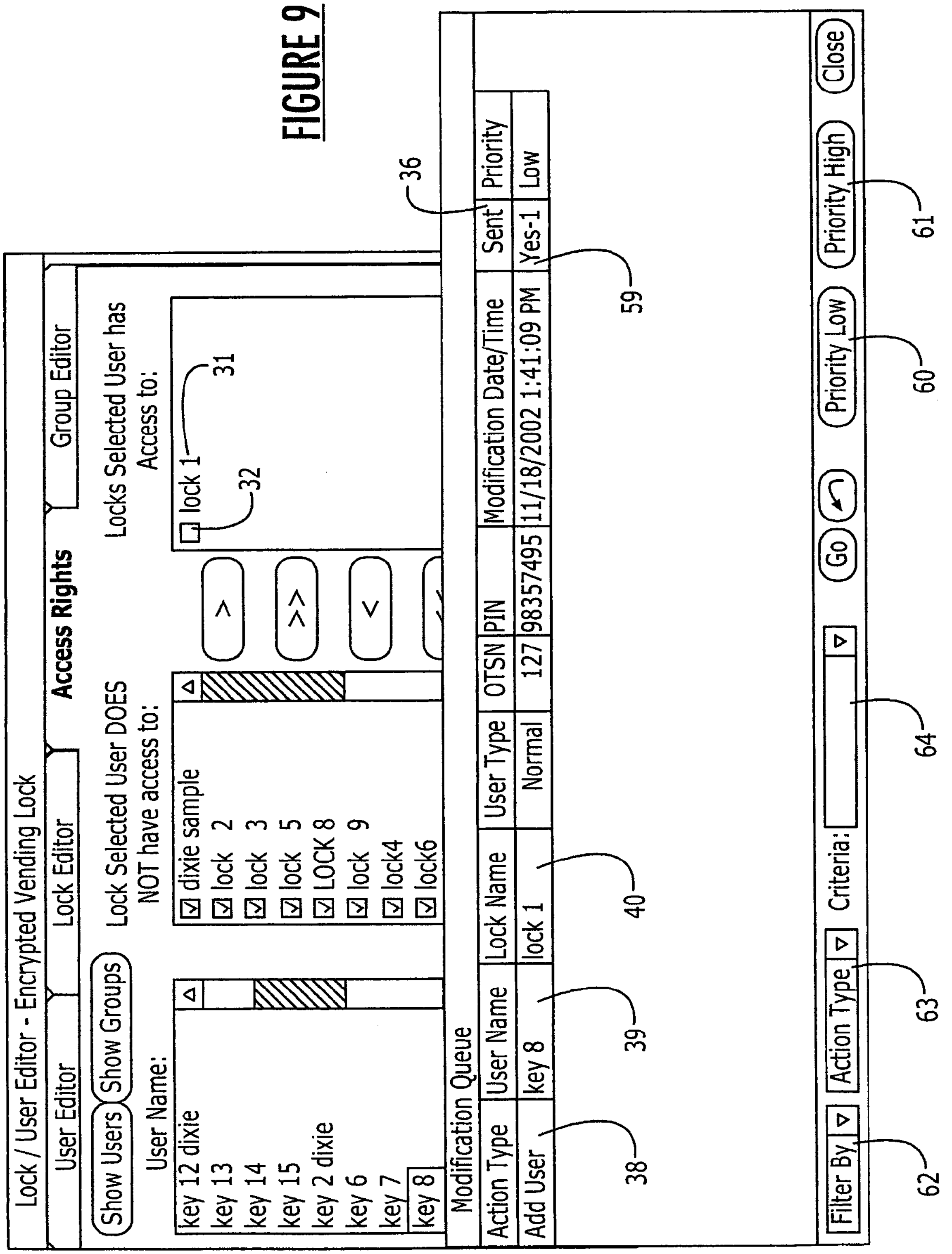
FIG. 9 is a screen that shows the modification queue with a modification that has been sent.

Turning now to FIG. 9, changes to the modification queue after a key maintenance has been performed are displayed. FIG. 9 is identical to FIGS. 5–6 with the exception of the sent column 36. It now shows that the modification has been sent. This is shown by "Yes-1" 59. Each time a key maintenance is performed, the second half of this entry gets incremented (yes-2, yes-3 etc). This continues until a key maintenance is performed and a key comes back whose lock-key manipulations section shows that the modification has been completed.

Various bookkeeping functions are available in the modification queue. These include filter/sort 62, action type 63, and criteria 64. The filtering option allows the administrator to remove all entries except those containing a specific character string. The sort command will place the queue in alphabetical order. The administrator chooses the desired filtering or sorting in the action type 63 pull down menu. Specifically the administrator chooses in which column the operation will be performed. Finally, the administrator chooses the criteria, or the specific character string in which to operate. An example would be "filter by" 62, user name in the action type 63 box, and "key 8" in the criteria 64 box. If the administrator performed this filter, the screen would only show modifications involving "key 8".

An additional operation available in the modification queue is the ability to set a higher priority on some desired modifications. This may be needed due to possible limited number of lock-key manipulations that each key can store. In one exemplary embodiment, the key is limited to two hundred manipulations. When a key maintenance is performed, the software takes the oldest two hundred modifications and loads them on the key. It is feasible that the administrator may perform a manipulation that needs to be performed immediately, and there are more than two hundred manipulations in the modification log. By pressing the priority high button 61, the manipulation has a higher priority and is taken first during a key maintenance. The key maintenance procedure will take the "high priority" manipulations first, then it will take the oldest "low priority" manipulations until two hundred are placed on the key. If a manipulation was inadvertently given "high priority," the "priority low" button 60 can be used to correct.

Figure 10:
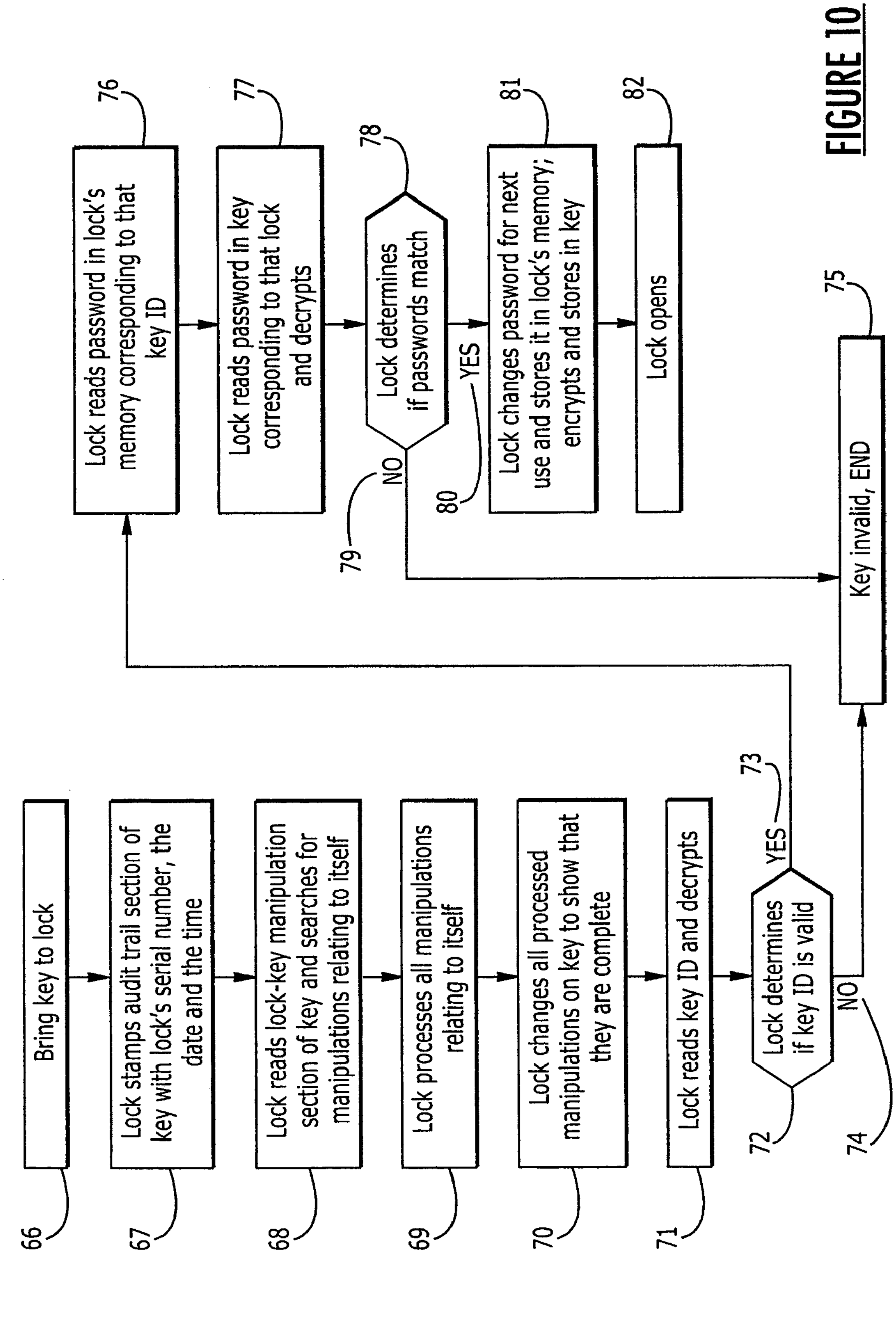
FIG. 10 is a flow chart showing the key validation process.

When the key is taken to a lock, a number of operations are performed. This process is illustrated in FIG. 10. For this exemplary embodiment, "key 8" is taken by an operator to "lock 1". The first step is the presentation of the key to the lock 66. The key may be Dallas Semiconductor 64 k iButton® manufactured by Dallas Semiconductor having offices at 4401 South Beltwood Parkway, Dallas, Tex., 75244. The iButton® is a memory chip mounted in a two-piece metal can. Simply touching the metal can to an iButton® receptor allows a microprocessor based system to read from and write to the chip's (key's) memory. One such system employs an iButton® with 64 k of memory. The internal memory structure of the key is divided into five hundred pages. These pages are divided as follows: one hundred lock passwords, two hundred lock-key database manipulation pages, and two hundred key audit trail pages.

The presentation is performed by simply placing the key against an iButton ® receptor, such that the key and the receptor are in electrical contact. The communication is automatic (as seen by the user) and is detailed in technical manuals published by Dallas Semiconductor. The entire process disclosed in FIG. 10 may be performed by the lock's microprocessor communicating with the memory inside the key. It requires no intervention or action by the operator, with the exception of the operator placing the key on the receptor. Of course, other key systems may be used in practice of the present invention besides the Dallas Semiconductor iButton®.

The first lock to key communication occurs when the lock places the lock's serial number and the date and time in the key's audit trail memory section 67. In this exemplary embodiment, the key can remember a maximum of two hundred audit trails. When the audit trail section is full, the oldest entry gets replaced by the newest. Secondly, the lock reads the lock-key manipulation section of the key 68. The lock then searches for any modifications that relate to this particular lock. In this exemplary embodiment, the key is limited to two hundred manipulations, so theoretically there could be one manipulation that corresponds to the lock that is scanning the key and one hundred ninety nine that correspond to other locks. The manipulations could include the "add user" command and the "delete user" command.

The manipulations are then processed 69. If the lock reads an "add user" command, it will add that user (key) as a valid user (along with its key ID and password) to the lock's memory. If the lock reads a "delete user" command, the lock will delete that user (along with its key ID and password) from the lock's memory. If the lock gets a "delete user" command for a user that is not in the lock's memory, the lock will remember that user number and block any "add user" commands for that user that the lock may get in the future. After the manipulations are processed, the lock changes the modifications on the key to show that they are complete 70. For example, an "add user" command is replaced with an "added user" command.

After the audit trail section of the key has been written to 67 and the lock-key manipulations have been performed 68, 69, and 70 the lock then determines if the key is valid, and if this is the case, the lock will open. The first step in this process is reading of the key ID 71 by the lock. The key ID is encrypted and therefore must be decrypted. The lock compares the key ID to the list of valid key IDs in the lock's memory and determines its validity 72. If the key ID is not valid 74, the process is completed and the lock does not open 75. If the key ID is valid 73, the lock searches the lock's memory for the password that corresponds to that key 76. The lock then searches the key's memory for the password that corresponds to that specific lock 77. Since the password is encrypted, the lock must decrypt it. The lock then compares the two passwords and determines if they match 78. If they do not match, then the key is not valid 79, the process is completed and the lock does not open 75. If the passwords match 80, the key is determined to be valid. The lock then picks a new password to be used for the next access. This new password is then stored in the key (encrypted) and in the lock 81. The lock then opens 82. The process of changing passwords makes electronically "picking" or "hacking" the lock significantly more difficult since not only must the key ID be known, but a constantly changing password must be known to gain unauthorized access. The encryption process adds another level of complexity to the hacking process.

The lock may be any motor or solenoid based mechanical system that has a microprocessor based control circuit, provided with memory. Typically, the motor or solenoid controls a linkage that locks a door. However, the lock may be used in conjunction with structures other than doors in different exemplary embodiments of the present invention.

Figure 11:
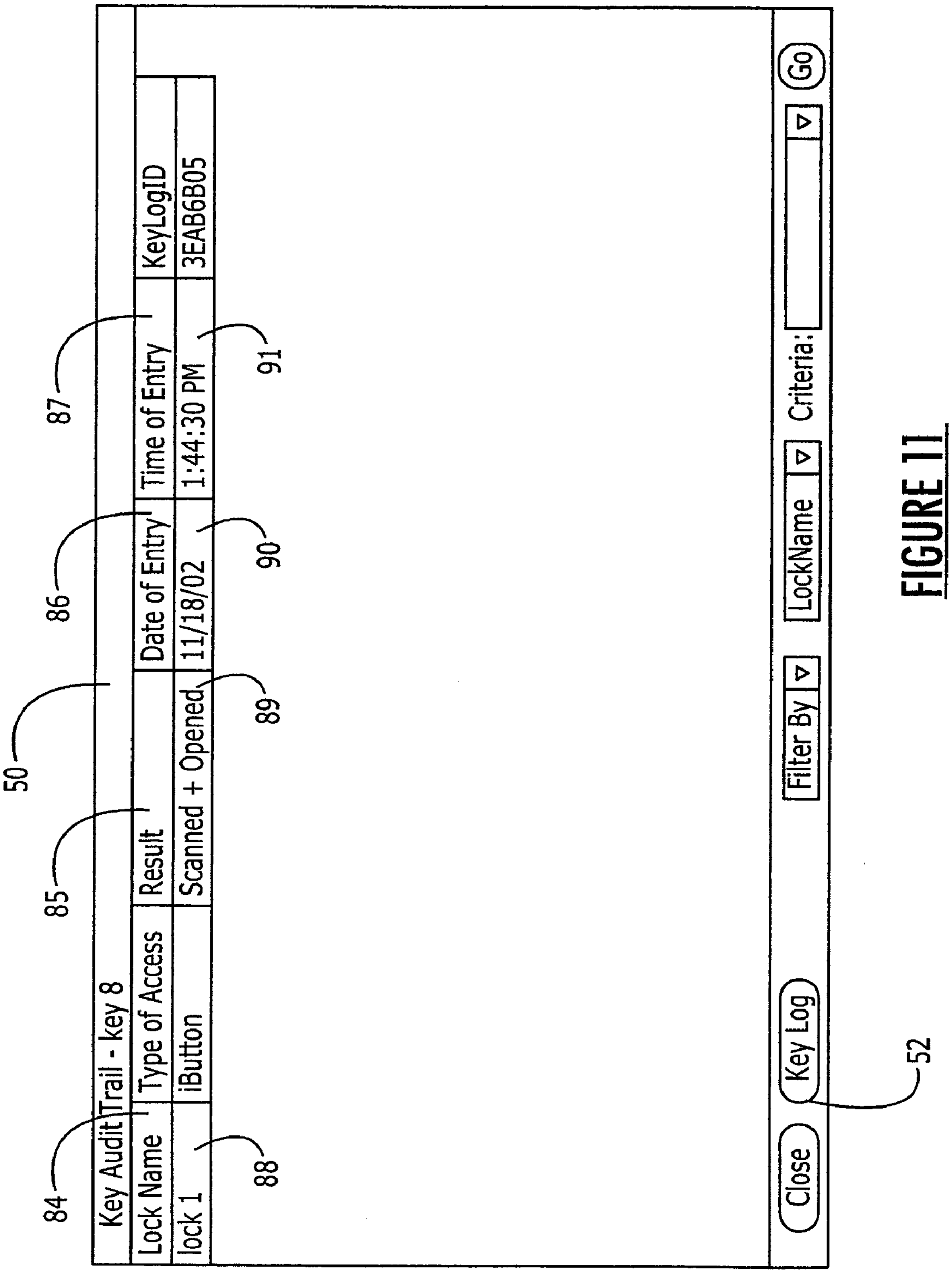
FIG. 11 is a screen showing the key audit trail.
Figure 12:
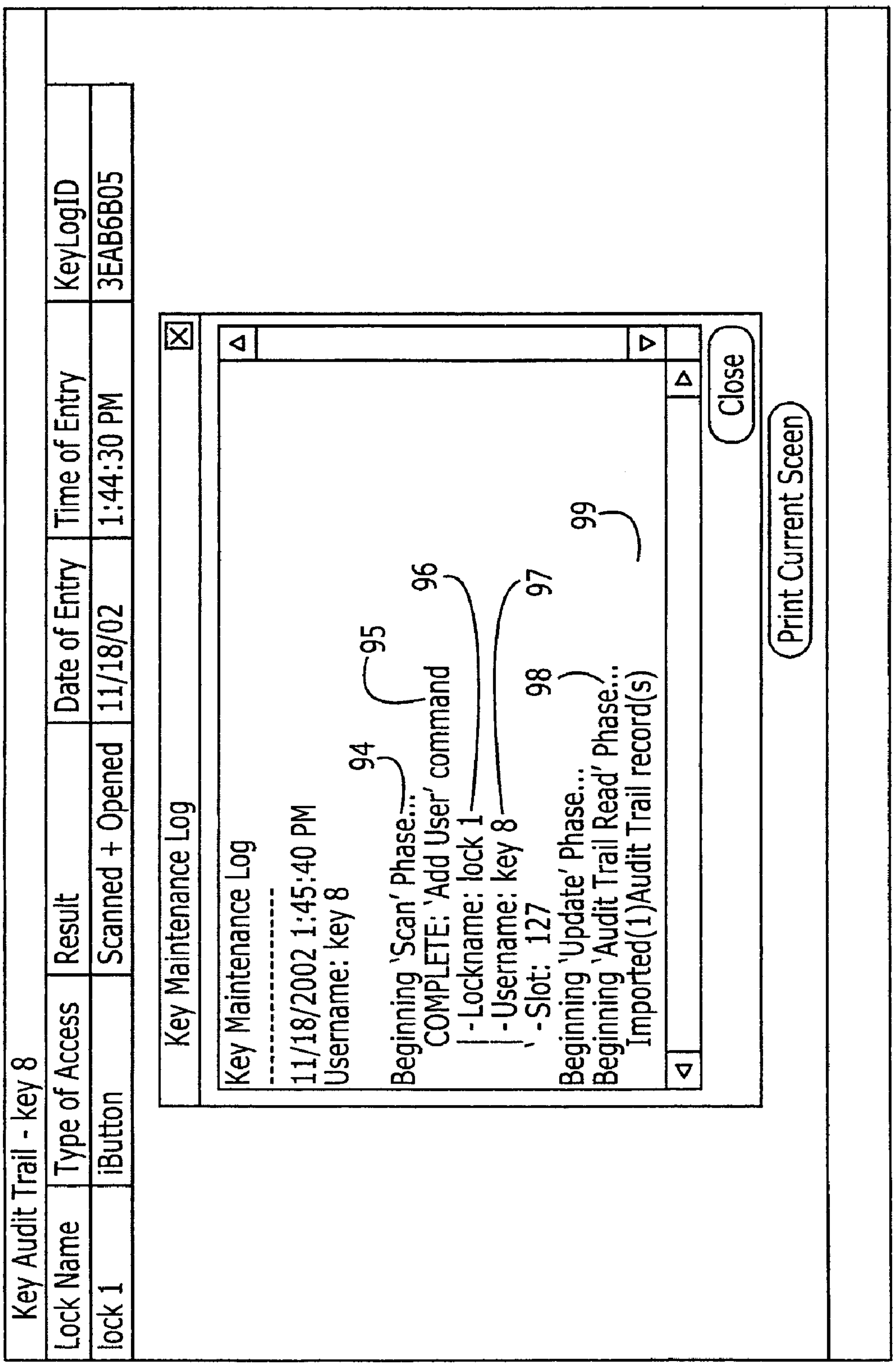
FIG. 12 is a screen showing the key maintenance log for a completed modification.

After the key as been brought to the lock(s), it is returned to the administrator to remove, process, and record the audit trail(s) and the completed modification(s). The administrator performs the key maintenance procedure, again, as described in FIG. 7. Turning now to FIG. 11, the audit trail window 50 shows information received from "key 8". The audit trail report is multi-column. It consists of a lock name 84, a result 85, a date 86, and a time 87. In this exemplary embodiment, the lock name column 84 shows that the key was brought to "lock 1" 88. The result column 85 shows that the key was scanned and opened 89. It is possible for this column to also show that the key processing was interrupted or that it was just scanned and not opened. The date 86 and time 87 show the date 90 and time 91 that the key was brought to the lock, in this case 1:44 pm on Nov. 18, 2002. Pressing the key log 52 button will bring up the details of the key maintenance, as shown in FIG. 12. Here, the key was scanned 94, there was a completed "add user" command on the key 95, this command led to "key 8" 97 being added to "lock 1" 96. If there were multiple completed modifications on the key, each of these modifications would be shown in kind. Finally, the audit trail section of the key was read on the key 98 and one audit trail was found 99. This audit trail was displayed and shown in reference numerals 88–91 as labeled in FIG. 11. If there were any new/incomplete modifications, as shown in the modification queue of FIG. 6, they would be added to the key at this time.

Figure 13:
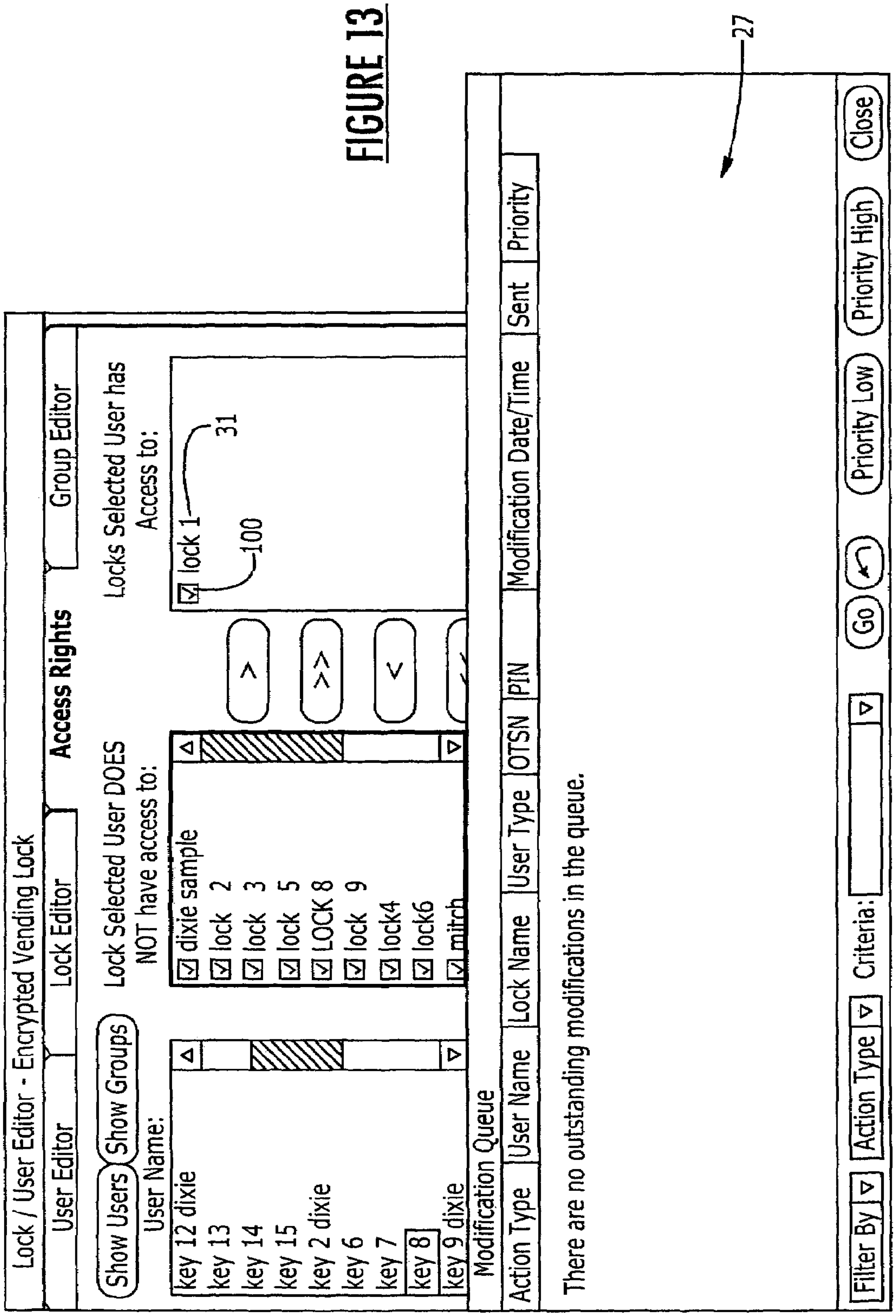
FIG. 13 is a screen that indicates the modification is in a complete state.

Turning now to FIG. 13, the completed manipulation is shown as being processed. FIG. 13 is identical to FIG. 5–6 except there is a check mark in the box 100 next to "lock 1" 31. This shows that the manipulation is now complete, and the software knows it is accurately representing the status of the lock's memory. Therefore, a complete change may be defined as a change that has not only been changed in the computer, but has been verified to occurred in the lock's memory. It can also be seen that the modification queue 27 is now empty.

The system therefore uses the standard user keys as the vehicle for transferring the information from the computer system to the lock's memory. The system may not require any further action (or knowledge of the transfer, for that matter) by the operator to perform the information transfer. The system may be entirely automatic at the lock end.

Figure 14:
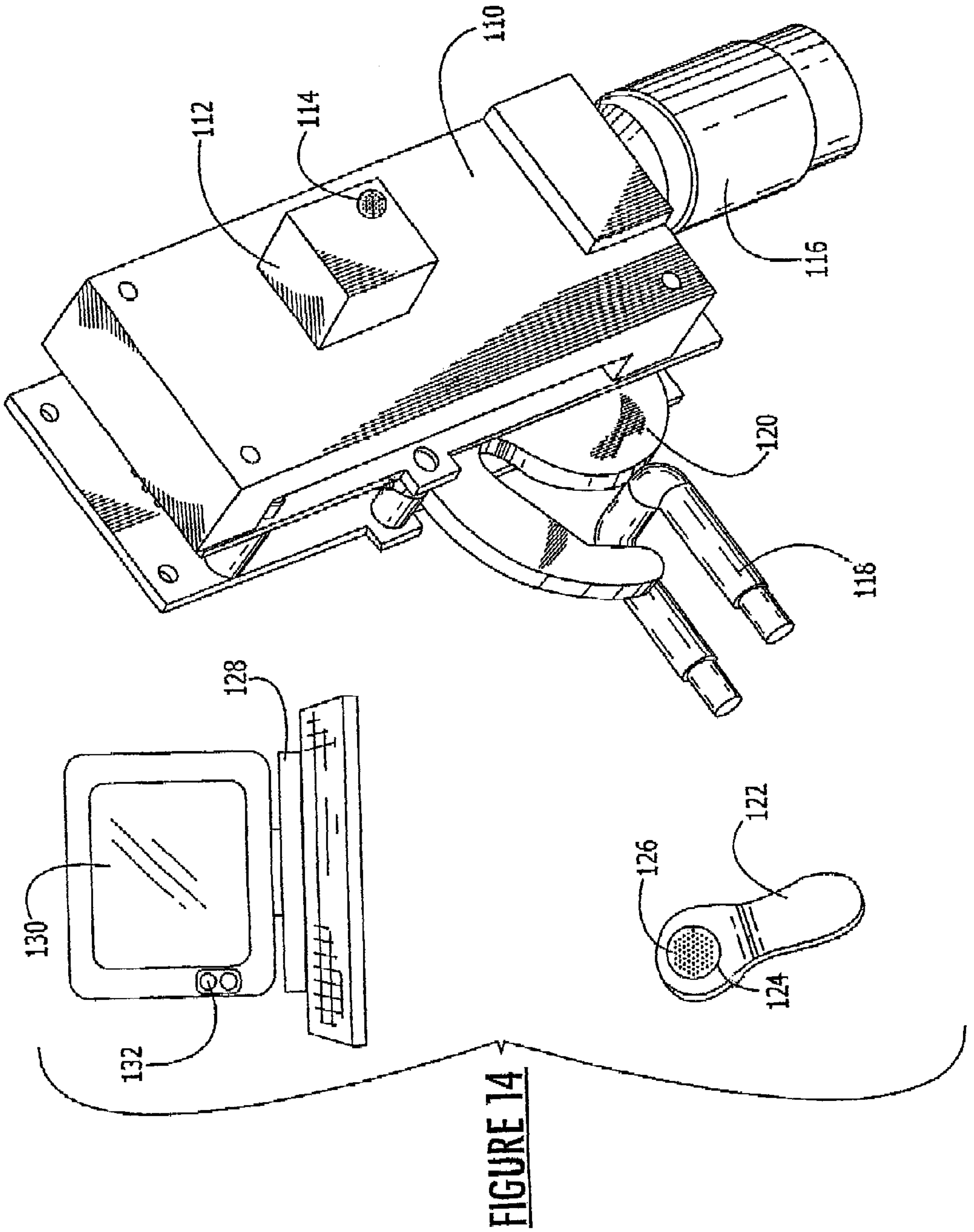
FIG. 14 is a perspective view of an electronic lock system in accordance with an exemplary embodiment of the present invention.

FIG. 14 shows an electronic lock system that may in one exemplary embodiment incorporate the user addition, deletion and verification feature as described herein. The electronic lock system is provided with a lock 110 that may be as described in commonly owned U.S. patent application Ser. No. 10/318,328 entitled "Electromechanical Locking Mechanism" filed on Dec. 12, 2002, assigned to Compx Inc. and whose inventors are Richard A. Martinez, Brian Lee Hahn, Mitch Mlynarczyk, Michael Kock, Robert Brewczynski, Claudia Juliana Bevilacqua, Kenneth A. Kaczmarz, Brock Robinson, and John Payson. Such U.S. patent application Ser. No. 10/318,328 is incorporated by reference in its entirety herein for all purposes. The lock 110 is provided with a motor 116 that may be actuated through a microprocessor based control circuit in the lock 110. The motor 116 turns a latching hook 120 in order to either engage or disengage a U-bolt 118. The U-bolt 118 may be connected to a door or other structure desired to be closed and/or locked by the lock 110.

The lock 110 is also. provided with a lock memory 112. The lock memory 112 may either include the microprocessor control circuit in the lock 110 or be in communication with the microprocessor control circuit. The lock memory 112 is provided with a memory interface 114 in order to communicate with a key 122. The key 122 incorporates therein a key memory 124 and a key interface 126. The key interface 126 may be placed in contact with the memory interface 114 of lock 110 in order to transfer data to and from the lock memory 112 and key memory 124.

The electronic lock system also includes a computer 128 into which a database 130 may be retained. The database 130 may be used in order to create a dataset of key to lock relationships, and a modification log that may be used to alter the key to lock relationship. The computer 128 has a computer to key interface 132 that is used for transmitting data to and from the key memory 124 through the key interface 126.

It should be understood that the present invention includes various modifications that can be made to embodiments of the system and method for key control in an electronic locking system described herein as come within the scope of the appended claims and their equivalents.

What is claimed:

1. A method for use with an electronic locking system, comprising the steps of:

selecting at least one key having a memory to have access to at least one lock having a memory in order to form a dataset of key to lock relationships;

transferring the dataset of key to lock relationships to the memory of at least one key;

presenting the key to at least one of the locks;

transferring at least a portion of the dataset of key to lock relationships from the key to the memory of the lock in order to update the memory of the lock;

updating the memory of the key to reflect the update to the lock; and transferring at least a portion of the memory of the key to a database in order to update the database to indicate completion of the update to the memory of the lock.

2. The method of claim 1, wherein the dataset of key to lock relationships includes corresponding a plurality of the keys to a plurality of the locks to define which of the keys have access to open which of the locks.

3. The method of claim 1, wherein the database includes the dataset of key to lock relationships.

4. The method of claim 1, wherein the lock is an electronic lock having a serial number with a unique alphanumeric lock name assigned to the serial number of the lock in the dataset of key to lock relationships, and wherein the key is an electronic key having a serial number with a unique alphanumeric user name assigned to the serial number of the key in the dataset of key to lock relationships.

5. The method of claim 1, further comprising the step of creating a modification log entry in the database every time the step of selecting at least one key to have access to at least one lock occurs.

6. The method of claim 5, wherein the modification log entry is marked as incomplete until the step of transferring at least a portion of the memory of the key to a database occurs, at which time the modification log entry is marked as complete to indicate completion of the update to the memory of the lock.

7. The method of claim 1, wherein the step of updating the memory of the key further includes writing a serial number of the lock to the memory of the key, and writing the date and time to the memory of the key.

8. The method of claim 1, wherein the step of transferring at least a portion of the dataset of key to lock relationships from the key to a memory of the lock includes transferring only the portion of the dataset of the key to lock relationships specific to that particular lock, and indicating a change in the key to lock relationships from those all ready present in the memory of the lock.

9. The method of claim 1, wherein:

the key has an encrypted key ID and the lock has a list of valid key IDs in the memory of the lock; and said method further comprising the steps of:

decrypting the key ID by the lock;

comparing the key ID to the list of valid key IDs in the memory of the lock; and opening the lock if a valid key ID is determined by the lock.

10. The method of claim 1, wherein:

the key has an encrypted key password in the memory of the key corresponding to the lock; and the lock has a lock password corresponding to the key in the memory of the lock; and said method further comprising the steps of:

searching the key memory for the encrypted key password that corresponds to the lock;

decrypting the key password by the lock;

comparing the key password to the lock password corresponding to the key and opening the lock if the two passwords match;

selecting a new lock password and a matching new key password;

encrypting the new key password; and storing the new encrypted key password in the memory of the key.

11. The method of claim 1, wherein:

the key has an encrypted key ID;

the locks have a list of valid key IDs in the memory of the lock;

the key has an encrypted key password in the memory of the key corresponding to the lock;

the lock has a lock password corresponding to the key in the memory of the lock; and said method further comprising the steps of:

decrypting the key ID by the lock;

comparing the key ID to the list of valid key IDs in the memory of the lock;

determining the key to be valid if the IDs match and maintain the lock closed if the IDs are different;

searching the key memory for the encrypted key password that corresponds to the lock;

decrypting the key password by the lock;

comparing the key password to the lock password corresponding to the key;

selecting a new lock password and a matching new key password;

encrypting the new key password;

storing the new encrypted key password in the memory of the key; and opening the lock if the IDs match and the passwords match as determined by the step of determining the key to be valid, and by the step of comparing the key password to the lock password.

12. The method of claim 1, further comprising the step of displaying a listing of locks that the key was presented to since the last time the step of transferring at least a portion of memory of the key to the database occurred.

13. A method for use with an electronic locking system, comprising the steps of:

modifying a dataset of key to lock relationships in order to create a modification log having at least one key being added or deleted to at least one lock;

transferring the modification log to a memory of at least one key;

presenting the key to at least one lock;

reading the modification log by the lock and updating the memory of the lock to reflect any addition or deletion of keys to the lock as indicated in the modification log, the modification log read by the lock being in the memory of the key;

updating the modification log in the memory of the key to indicate the updating of the memory of the lock was completed; and reading the modification log from the memory of the key and updating a database to reflect that the update to the memory of the lock was completed.

14. The method of claim 13, wherein the addition of the key to the lock indicates that the lock is allowed to be opened by the key, and the deletion of the key to the lock indicates that the lock is not allowed to be opened by the key.

15. The method of claim 13, wherein the dataset of key to lock relationships and the modification log is stored in the database.

16. The method of claim 13, wherein the lock is an electronic lock having a serial number with a unique alphanumeric lock name assigned to the serial number of the lock in the dataset of key to lock relationships, and wherein the key is an electronic key having a serial number with a unique alphanumeric user name assigned to the serial number of the key in the dataset of key to lock relationships.

17. The method of claim 13, wherein the database includes the modification log and the addition or deletion of the key to the lock is marked as incomplete until the modification log is read from the memory of the key and updated into the database, after updating the addition or deletion of the key to the lock the entry in the modification log is marked as complete.

18. The method of claim 13, further including the step of updating the memory of the key with a serial number of the lock, the date, and the time upon being presented to the lock.

19. The method of claim 13, further comprising the steps of:

using an encrypted key ID in order to validate whether the key presented to the lock is authorized to open the lock;

using an encrypted key password in order to validate whether the key has authorization to open the lock; and opening the lock upon determining the key is authorized upon verifying the key ID and the key password.

20. The method of claim 13, wherein:

the key has an encrypted key ID;

the lock has a listing of valid key IDs in the memory of the lock;

the key has an encrypted key password in the memory of the key corresponding to the lock;

the lock has a lock password corresponding to the key in the memory of the lock; and further comprising the steps of:

decrypting the key ID by the lock;

comparing the key ID to the list of valid key IDs in the memory of the lock;

determining the key to be valid if the IDs match and maintaining the lock closed if the IDs are different;

searching the key memory for the encrypted key password that corresponds to the lock;

decrypting the key password by the lock;

comparing the key password to the lock password corresponding to the key;

selecting a new lock password and a matching new key password;

encrypting the new key password;

storing the new encrypted key password in the memory of the key; and opening the lock if the IDs match and the password match as determined by the step of determining the key to be valid, and by the step of comparing the key password to the lock password.

21. An electronic lock system, comprising:

a lock having a microprocessor based control circuit;

a lock memory in communication with the microprocessor based control circuit of the lock, the lock memory having a listing of keys that have access to the lock stored therein;

a key having a key memory, the key configured for communication with the lock memory such that data being transferable to and from the key memory and lock memory, the key memory having a modification log stored therein containing additions and deletions of keys to the lock;

a computer having a database with a listing of keys that have access to a listing of locks, the computer configured for communication with the key;

wherein the modification log is created by the computer, transferred to the key memory, and at least a portion of the modification log transferred to the lock memory to update the listing of keys that have access to the locks;

wherein the modification log in the key memory is updated to reflect the update to the lock memory; and wherein at least a portion of the updated modification log in the key memory is transferred to the computer in order to verify completion of an update to the listing of keys that have access to a listing of locks.

22. The electronic lock system of claim 21, wherein the listing of keys that have access to the lock allows the key that has access to the lock to open the lock.

23. The electronic lock system of claim 21, wherein the lock has a serial number, and wherein the serial number, the date, and the time are transferred to the modification log during the updating of the modification log in the key memory, and wherein the serial number, date, and time are transferred to the computer.

24. The electronic lock system of claim 21, wherein the key has an encrypted key ID, the lock memory has a list of valid key IDs, the key memory has an encrypted key password, and the lock memory has an encrypted lock password corresponding to the encrypted key password.

25. The electronic lock system of claim 21, wherein the key memory is divided into five hundred pages wherein one hundred pages include lock passwords, two hundred pages include lock-key database manipulation pages, and two hundred pages include key audit trail pages.

26. The electronic lock system of claim 21, wherein the lock has a motor actuated by the microprocessor based control circuit in order to open and close a latching hook of the lock.

* * * * *